United States Patent [19]
Seeley et al.

[11] Patent Number: 6,097,429
[45] Date of Patent: Aug. 1, 2000

[54] SITE CONTROL UNIT FOR VIDEO SECURITY SYSTEM

[75] Inventors: John E. Seeley, Bucks County; William R. Vogt, Morris County, both of N.J.; Gregory L. Hobson; Randal L. Dunn, both of St. Charles County, Mo.

[73] Assignees: Esco Electronics Corporation, St. Louis, Mo.; ADT Services AG, Schaffhausen, Switzerland

[21] Appl. No.: 08/904,510

[22] Filed: Aug. 1, 1997

[51] Int. Cl.[7] .................................................. H04N 7/18
[52] U.S. Cl. ............................................ 348/154; 348/159
[58] Field of Search ...................................... 348/152, 153, 348/154, 155, 159; H04N 7/18

[56] References Cited

U.S. PATENT DOCUMENTS

| | | |
|---|---|---|
| 3,740,466 | 6/1973 | Marshall et al. . |
| 4,249,207 | 2/1981 | Harman et al. . |
| 4,257,063 | 3/1981 | Loughry et al. . |
| 4,458,266 | 7/1984 | Mahoney . |
| 4,511,886 | 4/1985 | Rodriguez . |
| 4,692,806 | 9/1987 | Anderson et al. . |
| 4,760,459 | 7/1988 | Sato et al. . |
| 4,777,526 | 10/1988 | Saitoh et al. . |
| 4,931,868 | 6/1990 | Kadar . |
| 5,099,322 | 3/1992 | Gove . |
| 5,109,278 | 4/1992 | Erickson et al. . |
| 5,111,291 | 5/1992 | Erickson et al. . |
| 5,144,661 | 9/1992 | Shamosh et al. . |
| 5,187,352 | 2/1993 | Blair et al. . |
| 5,202,759 | 4/1993 | Laycock . |
| 5,227,863 | 7/1993 | Bilbrey et al. . |
| 5,229,850 | 7/1993 | Toyoshima ............................ 348/153 |
| 5,237,408 | 8/1993 | Blum et al. . |
| 5,239,459 | 8/1993 | Hunt et al. . |
| 5,267,328 | 11/1993 | Gouge . |
| 5,455,561 | 10/1995 | Brown . |
| 5,491,511 | 2/1996 | Odle . |
| 5,521,634 | 5/1996 | McGary ................................. 348/153 |
| 5,530,429 | 6/1996 | Hablov et al. . |
| 5,581,297 | 12/1996 | Koz et al. . |
| 5,602,585 | 2/1997 | Dickinson et al. . |
| 5,610,580 | 3/1997 | Lai . |
| 5,615,017 | 3/1997 | Choi ...................................... 348/159 |
| 5,629,981 | 5/1997 | Nerlikar . |
| 5,666,157 | 9/1997 | Aviv ...................................... 348/152 |
| 5,825,432 | 10/1998 | Yonezawa .............................. 348/153 |
| 5,895,453 | 4/1999 | Cook ..................................... 348/153 |
| 5,923,364 | 7/1999 | Rhodes .................................. 348/159 |
| 5,926,209 | 7/1999 | Glatt ...................................... 348/143 |

*Primary Examiner*—Howard Britton
*Attorney, Agent, or Firm*—Polster, Lieder, Woodruff & Lucchesi, L.C.

[57] ABSTRACT

A site control unit (12) located at a premises (F) processing video images obtained from a plurality of cameras (22) located about the premises and relaying the presence of a real intrusion to a central station (CS). The site control unit has an image acquisition module (24) receiving video images from the cameras. An image processor (30) processes the images to eliminate possible causes of false alarms of an intrusion and reliably detecting actual intrusions. The processor includes video masking (32) to filter known motion present within a scene, detection (34) detecting movement in unmasked portions of the scene, and recognition (36) classifying the cause of the movement. An indication of an intrusion is given only if the cause is one of a class of predetermined causes representing an intruder on the premises, or an unknown cause. A video recorder (38) records images of the actual intrusion and supplies recorded images to a security system operator (O) who informs authorities of in intrusion. The video recorder produces snapshots (X1–Xn) of a scene viewed by the camera detecting the intrusion detected, authenticates (42) the snapshots, and transmits (46) the snapshots for viewing by the operator.

49 Claims, 5 Drawing Sheets

SITE CONTROL UNIT FOR VIDEO SECURITY SYSTEM

CROSS-REFERENCE TO RELATED APPLICATIONS

The subject matter contained in this application is related to U.S. patent application Ser. No. 08/722,731, "Low False Alarm Rate Detection for Video Image Processing Based Security Systems," filed Dec. 23, 1996; now U.S. Pat. No. 5,956,424 U.S. patent application Ser. No. 08/757,838, "Authentication Algorithms for Video Images," filed Nov. 27, 1996; now U.S. Pat. No. 5,870,471 U.S. patent application Ser. No. 08/771,991 "Reduction in False Alarms of Image Processing Based Security Systems by Performing Classification of Objects Detected," filed Dec. 23, 1996; and U.S. patent application Ser. No. 08/772,595, "Rejection of Light Intrusion False Alarms in Video Security Systems," filed Dec. 23, 1996, now U.S. Pat. No. 5,937,092.

STATEMENT REGARDING FEDERALLY SPONSORED RESEARCH OR DEVELOPMENT

Not applicable.

BACKGROUND OF THE INVENTION

This invention relates to a video security system physically located at a site being protected; and, more particularly, to an essential interface between one or more cameras positioned about the site for monitoring purposes, and an alarm unit, as well as the interface between a camera and a remote operator. Whereas there is a growing number of video based security systems, a site control unit (SCU) of the present invention for a particular video based security system is unique. The SCU locally controls a plurality of cameras or other imaging equipment, processes perceived images using algorithms which identify potential sources of false alarms as well as detects the presence of an intruder, provides an alarm if the detected intruder is of a class for which an alarm is to be sounded, and provides video, audio and data output information to a control center, in accordance with a predetermined set of operating conditions.

Conventional security systems protect a building by employing a series of make/break contacts strategically placed at doors, windows, and other potential entry points. When a contact is broken and an alarm is sounded or relayed back to a control station located within the building, nearby the building, or remotely to a central control station of the security company employed to protect the premises from which the company monitors many premises. In addition to the make/break sensors, security companies may also use P.I.R. (passive infra red) sensors which sense heat differences caused by animate objects such as humans or animals, vibration sensors which, when placed upon a window for example, detect when the window is broken, and microwave sensors. As with the make/break sensors, when any one of the sensors indicates a detection, a system alarm is indicated. The alarm is also given if the alarm unit within the building to which the sensors are connected senses that the path to a sensor is interrupted or broken.

With current alarm systems, all that the receiver of an alarm, whether at a local or remote central station, knows is that an alarm has occurred. The system operator has no other knowledge by which he can determine if the alarm signals the presence of a real intruder, or if it is a false alarm. Sensors are notorious for going off during inclement weather (they are sensitive to large electromagnetic fields such as will occur during lightning conditions, etc.). Certain sensors are triggered by the presence of such animals as cats within their precincts. Regardless of why they occur, all false alarms detrimentally effect the efficiency and operation of a security system.

There are many criteria which determine whether or not an alarm condition exists. For example, when a person opens a door monitored by a sensor, a potential alarm condition is created. However, an alarm system typically has a keypad or other coded system control by which, if an appropriate entry is made, signifies that the alarm condition is not to be acted upon. Rather, the entrant is someone authorized to enter the premises. Further, the class of intruder (human, animal, etc.) may be perfectly acceptable in one set of circumstances, but not so in another. The common situation is one where if an intruder is human, that situation should result in an alarm being given. However, if the intruder is a cat a dog, for example, giving an alarm is inappropriate and such an alarm would be a false alarm. In an aviary, on the other hand, the presence of a human might be perfectly acceptable, but the presence of a cat or dog, should result in an alarm being given. Or, in an area where food is stored, the presence of a human may again be perfectly acceptable, but the appearance of mice or rats should trigger an alarm. As discussed hereafter, there is currently no alarm system which can be programmed to classify intruders, discriminate between acceptable and non-acceptable classes of intruders, and provide an appropriate alarm when the presence of an intruder from a non-acceptable class is detected.

False alarms plague the security system industry. While the situation is annoying when a false alarm is relayed to a local monitoring station, it becomes even worse when the alarm is relayed 2,000 miles or more to a security company's remote central station. Here, operators must use their experience of the particular circumstances surrounding the alarm (i.e., local weather conditions, past occurrences at that particular site, etc.), in order to make a determination as to whether or not the alarm is real. If their knowledge and experience tells them the alarm signifies an actual intrusion, they must then relay the alarm to the local police for that site so the police can conduct a further investigation.

There are numerous examples of when an alarm either did not work, or was rendered ineffective, simply because an operator at a control station had no insight into the facility where the alarm system was installed and from which an alarm emanated. In one anecdotal example, an alarm was triggered by a cat left in a residence. The police were called but discovered nothing, not even the cat, because the cat hid from strangers. After this situation repeated itself over a period of several hours, the police finally refused to investigate further. From that point on, the residence was essentially not protected. Over the years, situations resulting from false alarms have continued to worsen. Now, police often require some confirmation or evidence of an intrusion before investigating, or else they will give priority to those situations where they have greater certainty an intrusion has occurred. Security system companies have addressed this issue by providing an audio (or "listening-in") capability to the system. This enables the monitor to hear actual movement on the premises, the sound of voices, glass breaking, cabinets or drawers being opened, etc., with this information also being relayed to the authorities. Furthermore, in many locales, if the authorities investigate the report of an alarm and discover nothing, they will send the security company requesting the investigation a bill for their services.

In response to this situation, the security industry has begun to extensively use video cameras to constantly monitor premises. Use of cameras solves the problem of not just reacting to a make/break contact. The shortcomings with camera surveillance is that one needs to have a continuously connected communication channel with the sensor (camera), and the operator at the local or remote console must continuously monitor the video. Some systems have attempted to combine video with another sensing mechanism, I.R., for example, so that actuation of the video is controlled by the other sensor first sensing the presence of an intruder. For, if video is continuously required for a properly functioning system, a communications channel must be connected between the site and the monitoring station from the time the alarm system is energized. Because a monitoring period often exceeds 12 hours, the communication costs are high. To further control costs, the cameras employed at the monitored site are often slow scan cameras whose output is compressed onto POTS (plain old telephone system) lines (typically using 28.8k modems) with transmission rates of 1 frame of video over a 1–5 second interval. At the receiving end, the operator now must deal with two issues. First, because the frame rate is slow, what the operator sees is not what is necessarily occurring at that moment. Second, and more importantly, most of the time the operator will see nothing out of the ordinary. Yet, the operator must maintain a constant vigilance. This is a serious problem because it has been estimated that after watching a security system camera observing an unchanging scene for as little as 5 minutes, an operator's performance diminishes rapidly to the point where the operator is essentially ineffective after 30 minutes. One result of this, of course, is that false alarms still occur. As a consequence, the only real advantage video monitoring offers is that should an intrusion occur and should the operator notice it, then the relayed information sent to the local police will get high priority because of the certainty of the situation. Apart from this distinct advantage, the deficiencies of such a system are that it is very labor intensive, operator efficiency is usually very low, and communications costs are very high.

To overcome these problems while still providing the alarm system operator live images of an intrusion is the subject of the present invention. For, it is now possible, using the SCU described herein, to relay definitive information to the local police of an intrusion, as well as capture, maintain, and transmit images of the intrusion to the police or other authorities.

In co-pending U.S. patent application Ser. No. 08/771,991 (now abandoned) and U.S. Pat. Nos. 5,870,471, 5,937,092, and 5,956,424; the teachings of which are incorporated herein by reference, there is described a system and method for i) continuously viewing a scene to detect the presence of an intruder with a very low probability of false alarms and with a high probability of detection; and ii) a method for authenticating an image, and relaying the authenticated image from the protected site to a remote, viewing site. The fundamental detection process described in these applications involves establishing a reference scene (reference image) and comparing an image from the present scene (current image) with that reference. It is then determined whether any differences exist between the present and reference images. If the contents of the two images markedly differ, the result is interpreted as an intrusion of some kind within the scene having occurred. The detection process includes comparing, on a pixel by pixel basis, the current image with the reference image to obtain a difference image. In accordance with the process, any non-zero pixel in the difference image indicates the possible presence of an intrusion, after image artifacts such as noise, aliasing of the video, and movement within the scene not attributable to a life form (animal or human) such as the hands of a clock, screen savers on computers, oscillating fans, etc., have been accounted for. Because the system and method use an absolute difference technique with pixel by pixel subtraction, the process, as described in U.S. Pat. No. 5,937,092 is sensitive to surface differences between the scene but insensitive to light-on-dark or dark-on-light changes, and thus is very sensitive to any intrusion within the scene. Furthermore, each pixel represents a gray level measure of the scene intensity that is reflected from that part of the scene. Gray level intensity can change for a variety of reasons. The most important of these is a new physical presence at that particular part of the scene. The ability to make this determination, in accordance with the teachings set forth in these co-pending applications, removes from the human operator of the alarm system the initial responsibility of determining whether an intrusion results from a new human presence or otherwise. This, in turn, eliminates the need for the human operator to continuously monitor all of the cameras on the premises of the site being protected. Also, since monitoring is performed by the SCU, there is no need for a continuous communication path between the protected site and a remote operator. As described hereinafter, upon detection of an intrusion, a communication path is established, and high frame rate and high quality video is transferred from the site to the operator. This enables the operator to concur with the SCU's evaluation of an intrusion. Further, during an intrusion, and as described hereinafter, high resolution samples ("snapshots") of the video are taken by the SCU for later transfer to the alarm system operator at the operator's location. These samples are transferred using lossless compression techniques and are authenticated so as to be later admitted into court for prosecution purposes. Therefore, the same function has been achieved with a continuous relaying of the video remotely using slow scan cameras and with a high operator load.

Some efforts have previously been made to incorporate the recognition of objects, including humans, whose presence is detected or sensed in an image, into some type of control unit. For example, U.S. Pat. No. 5,305,390 to Frey et al., teaches recognition of persons or objects by height as they pass through a doorway or entrance. The intrinsic sensor is an active laser beam, and the system of Frey et al. operates by measuring the height of an object passing through an aperture (doorway) to classify the object as a person or not. Therefore, the system is a height discriminator rather than an object recognition or classification system. Thus, for example, if a person crawls through the aperture, they will probably be designated as a non-human.

U.S. Pat. No. 5,289,275 to Ishii et al., is directed to a surveillance monitoring system using image processing for monitoring fires and thefts. The patent teaches use of a color camera for monitoring fires and a method of comparing the color ratio at each pixel in an image to estimate the radiant energy represented by that pixel. A resulting ratio is compared to a threshold with the presence of a fire being indicated if the threshold is surpassed. A similar technique for detecting the presence of humans is also described. The patent teaches the use of image processing together with a camera to detect the presence of fires and abnormal objects.

U.S. Pat. No. 4,697,077 to Yausa et al. also teaches use of a camera to detect the presence of an object. Once an anomaly is detected because of differences in the comparison of an original and a later image, the system automatically dials and sends a difference image, provided the differences are large enough, to a remote site over a telephone e line. At the remote site, the image is viewed by a human. While teaching some aspects of detection, Yausa et al. does not go beyond the detection process to attempt and use image processing to recognize that the anomaly is caused by a human presence.

U.S. Pat. No. 4,257,063 which is directed to a video monitoring system and method, teaches that a video line from a camera can be compared to the same video line viewed at an earlier time to detect the presence of a human. However, here, the detection device is not a whole image device, nor does it make any compensation for light changes, nor does it teach attempting to automatically recognize the contents of an image as being derived from a human. Similarly, U.S. Pat. No. 4,161,750 teaches that changes in the average value of a video line can be used to detect the presence of an anomalous object. Whereas the implementation is different from the '063 patent, the teaching is basically the same.

All of these previous attempts at recognition have certain drawbacks, whether the type of imaging, method of processing, etc., which would result in either an alarm not being provided when one should, or in false alarms being given. The system and method of the present invention overcome these problems or shortcomings to reliably provide accurate indications of human intrusion in an area being monitored by a security system. Such an approach is particularly cost efficient because it reduces the necessity of guards having to patrol secured areas (which means each area will be observed only on an infrequent basis unless there are a large number of guards), while ensuring that any intrusion in any area is not only observed, but an appropriate alarm is sounded in the event of an intrusion by an intruder of an appropriately designated class for which an alarm is to be given.

The above examples deal only with recognition. As important for a sight control unit for a facility is the ability to handle multiple cameras, to perform recognition, timely transmit critical information, images, audio, and data to the facility monitor, authenticate images so transmitted, and operate interactively with the facility monitor or system operator.

BRIEF SUMMARY OF THE INVENTION

Among the several objects of the present invention may be noted the provision of a site control unit for a video alert or video alarm system incorporating an image processing method for detecting intrusions into a secured area. The alarm system operates on the premise that only the presence of an intruder of a designated class is of consequence and everything else is a false alarm. Accordingly, a recognition process is used to differentiate between those objects falling within and without a designated class of objects, so to reduce or substantially eliminate false alarms. In most circumstances, the designated class is human, and the differentiation process is to distinguish between humans and non-humans; however, regardless of the class of interest, objects falling within that class are identified and an alarm given. The site control unit provides automated video surveillance of a premises and intelligent image processing to filter out false alarms while reliably detecting intrusions.

Another object of the invention is for a site control unit capable of controlling the operation of a plurality of cameras some or all of which may be color cameras, and the others of which are black and white cameras. The cameras are strategically located about a facility, both inside and outside a building, and the site control unit selectively activates each of the cameras.

A third object of the invention is the provision of a site control unit locally controllable by an operator or security personnel at the site, or by remote control from a control center located some distance away. The remoteness of the control center from the site may be substantial; i.e., transcontinental, without the performance of the on-site security being effected, or with the outputs from the site control unit to the remote control center being degraded in any manner.

Another object of the invention is to facilitate the economical use of personnel by enabling adequate surveillance of the site with fewer guards or operators than otherwise would be required, and with various utilities such as telephone lines and the like only being employed in the event of a detected intrusion, and then only for so long as is required to send and receive appropriate data and instructions.

A further object of the invention is a site control unit which acquires, compresses and stores video images from a camera whenever there is a change in the scene, viewed by that camera. Additionally, the site control unit stores full resolution snapshots of the scene monitored by that camera, at predetermined intervals after the intrusion is detected. Both the snapshots and compressed video, together with audio (if available at the site) are transmitted over a communications channel from the premises to the control center for viewing by a system's operator. If commanded by the operator, the site control unit can also provide live video to the operator.

A further object of the invention is to provide and store a full resolution snapshot of the image used to determine that an intrusion has occurred, and then to continue to store snapshots at predetermined intervals for a predetermined period of time.

It is another object of the invention to provide a site control unit which authenticates snapshots.

A further object of the invention is a site control unit which can be remotely reprogrammed.

Finally, it is an object of the invention to provide a site control unit which continuously, reliably, and effectively monitors a facility for human intrusions (for example), reliably detects any such intrusions, and facilitates the giving of an appropriate alarm.

In accordance with the invention, generally stated, a site control unit for a security system controls a plurality of individually located cameras or other visual imaging equipment. The cameras monitor a facility and detect the motion of an object (an intruder) within any area being monitored. A camera continually viewing a designated area produces a visual image of the scene being observed. Processing equipment within the site control unit processes the images obtained by each camera (using appropriate algorithms) selectively armed (allowed to process) by the alarm unit to detect the presence of an intruder. When presence of an intruder is determined, the site control unit transmits this information, including appropriate video images, including authenticated snapshots to alert a system operator who then either undertakes a further investigation, or signals an alarm. Other objects and features will be in part apparent and in part pointed out hereinafter.

BRIEF DESCRIPTION OF THE SEVERAL VIEWS OF THE DRAWINGS

In the drawings.

Corresponding reference characters indicate corresponding parts throughout the drawings.

DETAILED DESCRIPTION OF THE INVENTION

Figure 1:
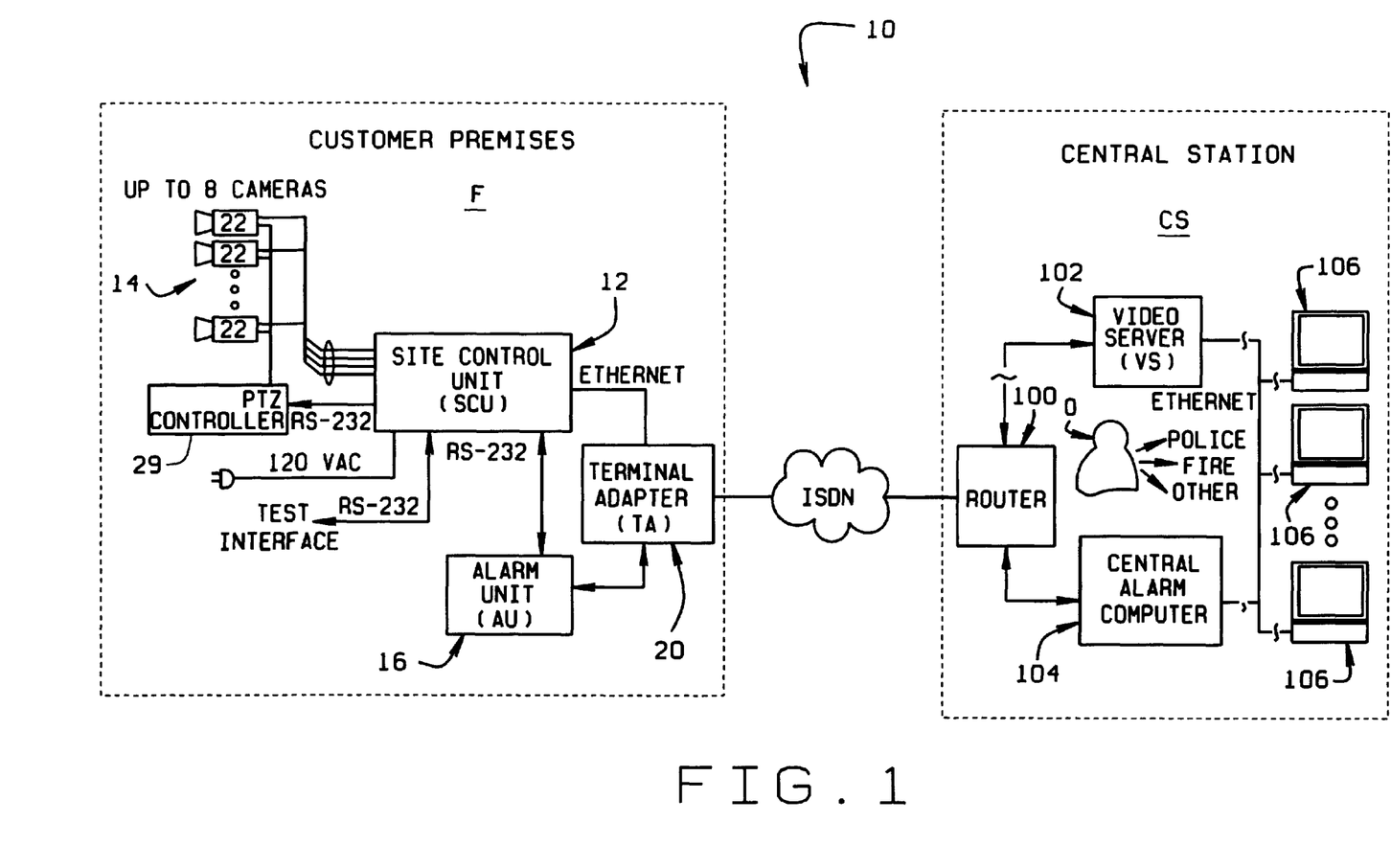
FIG. 1 is a block diagram of a video security system incorporating a site control unit of the present invention.

Referring to the drawings, an alarm or video security system 10 shown in FIG. 1 includes a site control unit (SCU) 12 which is physically located at an installation or facility F being monitored by the system. Alarm system 10 is fully described in co-pending application 08/904,509. The SCU has an associated imaging means 14 and operation of the SCU and the imaging means is described hereinafter. An output from the SCU is directed to an alarm unit 16 whose operation is described in co-pending application 08/904,949. The SCU further provides an output to a central station CS via a terminal adapter 20. An operator O monitors the facility from the central station CS and the information (images, audio, data) provided him or her by the SCU. The operator evaluates this information and, when necessary, informs police, fire, medical, or other authorities of a condition detected at the facility where SCU 12 is located. At the central station, a router 100, video server 102, and a central alarm computer 104, are interconnected with a plurality of workstations 106 to display video images and other information to the operator to assist the operator in determining whether the intrusion requires alerting the authorities. Operation of the alarm unit is described in co-pending application 08/904,949, and that o f the terminal adapter in co-pending application 08/904,913. With respect to the central station, operation of the work station is more fully described in co-pending application, 08/904,947, that of the central alarm computer in co-pending application 08/904, 948.

All of the applications referred to in the above paragraph are now commonly assigned to ADT Services AG, a Swiss corporation.

Two important features of the invention are first, that it informs operator O of the presence of an intruder at the facility, after having not only detected the intruder's presence, but also having confirmed that the intruder is one of a designated class(es) of intruders (usually a human intruder) for which some action is to be taken. The designated class can include unknown. For purposes of the following description, unwanted intruders whose presence are to be detected are human intruders. Second, it is important that false or unwanted alarms not be generated. To not place unduly high demands on operator O, and efficiently use his or her time, the invention operates to eliminate all false and unwanted alarms which might otherwise be given to the operator. This is done without impacting the overall probability of detecting and confirming the presence of an intruder, and providing this information to the operator. With other security systems, a fundamental cause of false alarms has been the sensors an d methodology used to ascertain if an intrusion has occurred. In these systems, both an alarm an d vide o are sent to an operator with the operator having the sole responsibility of examining the video and determining if there is an actual intrusion or not. As described in the above referenced co-pending application Ser. No. 08/771, 991, and U.S. Pat. Nos. 5,870,471, 5,937,092, and 5,956, 424, applications 08/772,731, 08/757,838, 08/771,991, and 08/772,595, use of appropriate processing methodology accounts for various effects which could otherwise trigger false alarms, so only a life form intruding into a scene produces an alarm. By quickly and efficiently differentiating between motion caused by humans and non-humans (animal) and other lighting effects, the monitoring task of the operator is simplified with actual intrusions resulting from detected human motion causing an alarm, but with unwanted alarms resulting from the motion of animals and lighting effects not being given.

Figure 2:
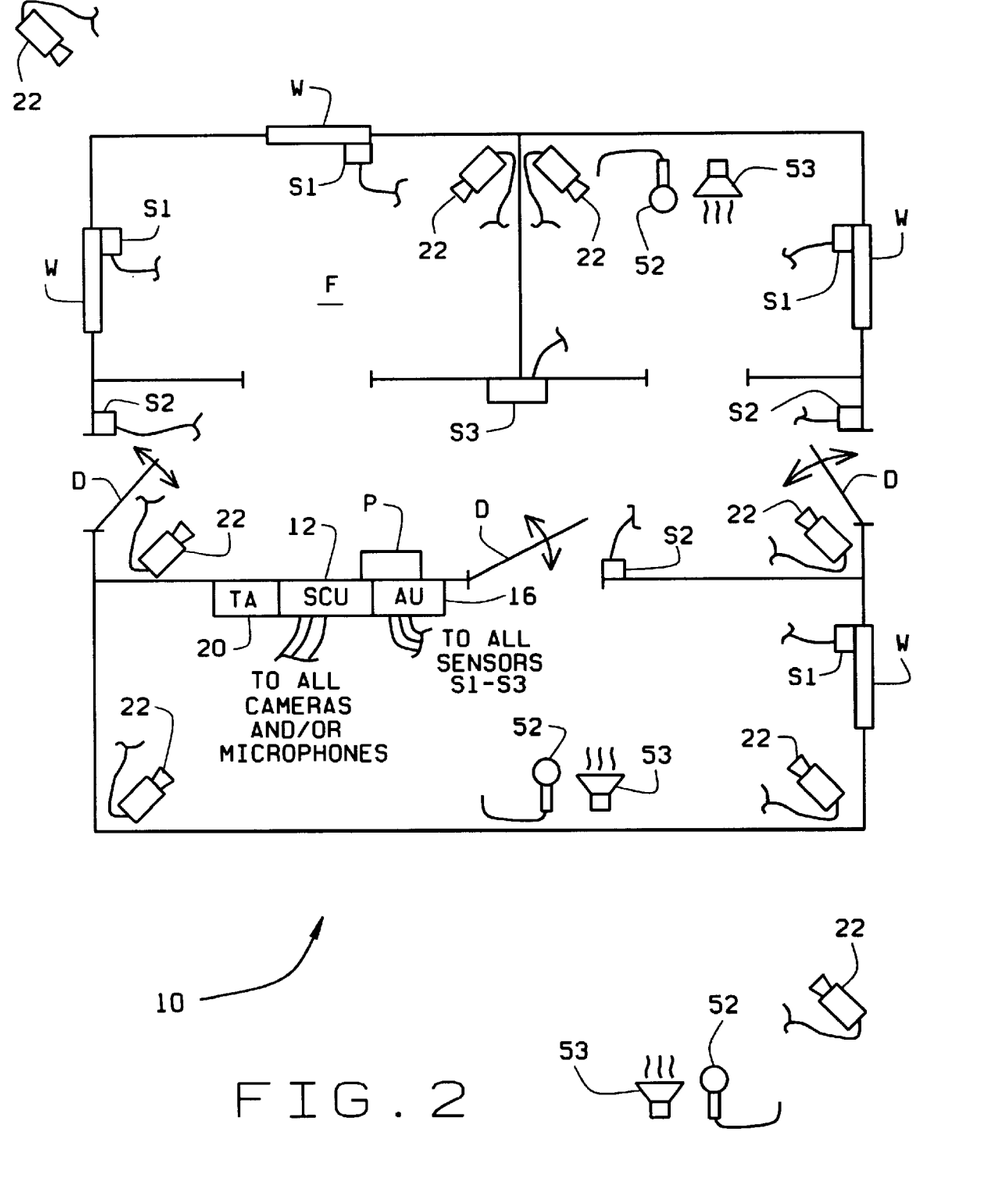
FIG. 2 is a representation of a facility in which a site control unit of the present invention is installed.
Figure 3:
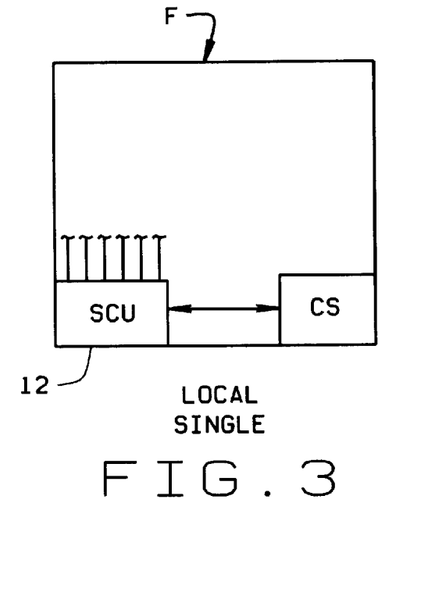
FIG. 3 is a simplified representation of a single site control used in conjunction with a local system controller.

Referring to FIG. 2, facility F is representative of the type of location with which alarm system 10 is used. That is, the facility has windows W and doors D. The windows may, for example, be provided with sensors S1 and each of the doors with a sensor S2. Both sensors S1 and S2 may be conventional make/break sensors, although sensor S1 may be a vibration sensor. A motion sensor S3 is installed in a passage through the facility to detect someone moving through the passage. Sensors S1–S3 are all well-known in the art. Alarm system 10 includes a SCU 12 located on the premises. The imaging means 14 (see FIG. 1) includes a plurality of video cameras 22 strategically located both inside and outside the facility. Outputs from the cameras 22 are routed to the SCU which, in turn, is connected to an alarm unit 16 of the alarm system also located at the site, as is terminal adapter 20. The window and door sensors S1, S2, and motion sensor S3 are connected to the alarm unit. Although shown located side by side in FIG. 2, the SCU and alarm unit do not have to be in close proximity The function of the SCU is to intelligently look at video provided by each of the cameras to determine if an intruder is present within any of the scenes viewed by the cameras. If it is determined that this is so, the SCU sends an alarm to alarm unit 16, and a video communications channel is opened between the SCU and the central station. Importantly, this video channel is not fully established until the SCU determines there is adequate reason for operator O to investigate. In that way, the operator does not have to continuously monitor unchanging video with which there is a low probability of an intruder presence. In fact, the reverse is true. That is, because the possibility of an intruder being present at a facility at any one time is remote, the operator can readily monitor many premises from the central station, even though these premises are widely separated from one another. When an SCU provides an indication of an intruder at a facility, a video image obtained from a camera at that site is provided to the operator. If the operator confirms an intruder's presence, the operator relays this information to investigating authorities. Further, the operator can provide the authorities with an accurate assessment of the situation at the facility so they can take the necessary precautions based upon the number of intruders, their ages, whether or not they are armed, etc.

As noted, sensors S1–S3 are connected to alarm unit 16. With this configuration, when a non-imaging sensor S triggers an alarm, the system operator can request a visual verification of the alarm condition from the nearest camera controlled by the SCU. This allows the operator to visually verify or reject the alarm condition with the same results as if the alarm had been triggered by the SCU. A control panel P may be conveniently located on the premises such that when the system is armed and someone enters the premises, the person can enter an appropriate code at panel P to signify that the entry is authorized, no intrusion has occurred, and hence no false alarm condition exists. The operator can remotely command the SCU to cycle through the cameras 22 under its control and so execute a "walk about" of the premises. This has substantially the same effect as a guard touring the premises; except that the walk about can be done at any time, under any weather conditions, and faster than a guard could do it. It is possible therefore, with the alarm system, to reduce or eliminate certain guard duties without detracting from the facility's overall security. In performing a walk about, it is the operator who establishes and controls a communication path between the SCU and the system control. First, as a security check, the operator through a secure password mechanism, establishes the communication link. Then, through the SCU, the operator selects a camera 22 from which to observe a scene. The SCU now temporarily suspends detection on that particular camera, but continues to check the scenes observed by the other cameras. When the operator is finished viewing one scene, he can move to another camera. SCU 12 accordingly suspends detection from the newly selected camera, and places the previously selected camera back into its surveillance mode. For any particular camera the operator is free to pan, tilt or zoom the camera to obtain a better view of the scene, or portion of scene of interest.

Figure 4:
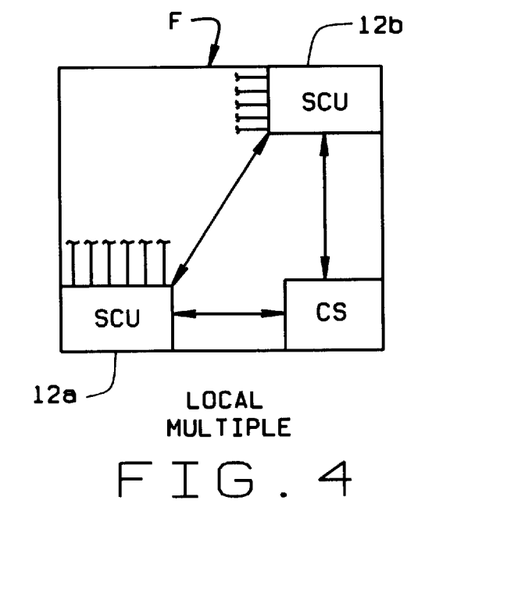
FIG. 4 is a simplified representation of multiple site control units used in conjunction with a local system controller.
Figure 5:
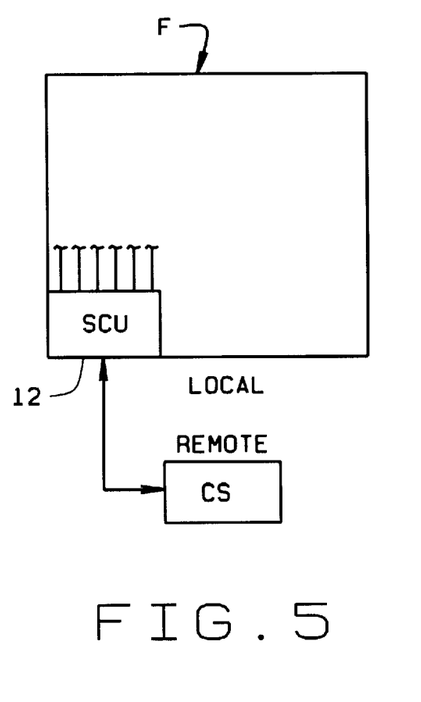
FIG. 5 is a simplified representation of a single site control used in conjunction with a remote system controller.
Figure 6:
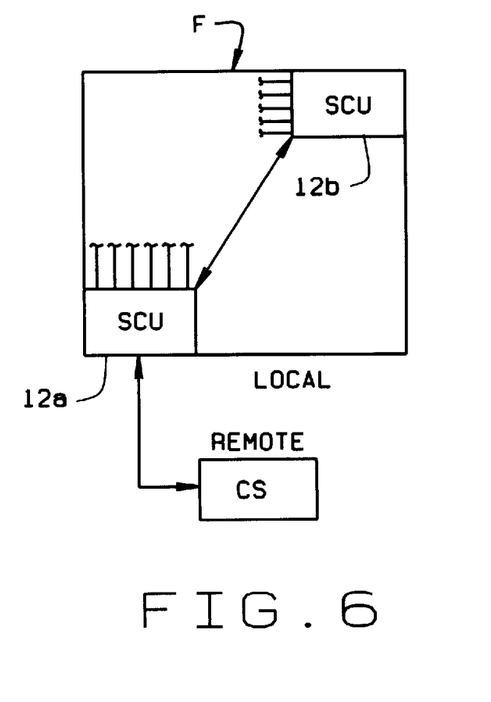
FIG. 6 is a simplified representation of multiple site control units used in conjunction with a remote system controller.

Referring to FIGS. 3–6, alarm system 10 can be configured in a variety of ways using one or more SCUs. Thus, in FIG. 3, both SCU 12 and the central station CS are both located at the same site. Depending upon the amount of monitoring utilized at a site, two or more SCUs, 12a, 12b, for example, are located at the site and both SCUs are locally controlled from the same station. This is as shown in FIG. 4. FIGS. 5 and 6 illustrate the situation where a single SCU 12 is located at the site and the system control is at a remote location. Or, even if two or more SCUs 12a, 12b are on site, both can be remotely operated from the central station.

SCU 12 includes an image acquisition section 24 receives video signals from each of the cameras 22, these signals representing images of the scene observed by the respective camera. Module 24 includes one or more multiplexers (MUX) 26. The SCU can accommodate a number of cameras 22, eight such cameras being shown in FIG. 2. The limit on the number of cameras is determined by the capacity of the multiplexers, the maximum distance cameras can be located from the SCU, and the time required during an operating cycle of the system to access all of the cameras before repeating the cycle again. This, in turn, is a function of processing power and speed of the SCU. For the eight cameras 22 shown in FIG. 2, for example, the cycle time for the SCU is approximately 1 second.

The cameras 22 are television cameras. It will be understood by those skilled in the art that the cameras may be black and white cameras, color cameras, or a combination of both. The cameras may conform to an analog television format standard such as the RS 170 or CCIR standards, or the camera input may be digital. Depending upon the area where they are located, some or all of the cameras may be low light cameras. Cameras 22 also do not need to operate in the visible portion of the light spectrum. Thus, the cameras may include IR (infra red) cameras or UV (ultra violet) cameras. The image may be created from the rf portion of the spectrum in which instance they may be high resolution SAR images, or an acoustic image can be produced from the acoustic portion of the spectrum. It will be understood that while an installation will typically employ only one type of camera (black and white, or color TV cameras, for example), the SCU can process images created from a combination of all of the cameras or image sensors discussed above and employed at the same time in a facility. As use of the facility changes, one type camera 22 can be replaced with another type camera without effecting overall performance of the SCU.

In operation, a controller section 28 of the SCU responds to commands from the central station and alarm unit 16 to operate the cameras. For example, if the alarm unit receives an alarm input from one of the sensors S1–S3 that it monitors, it may send a command signal to the SCU to turn "on" a camera 22 to obtain a visual image of the area where the sensor is located. The SCU also receives commands from the system operator to turn cameras "on" and "off". In addition, the SCU is controllable to turn the cameras "on" and "off". Usually, the SCU is controlled to turn the cameras "off" during that portion of a day when the premises being monitored is normally occupied. The SCU then may be commanded to turn the cameras "on" at a preset time at the end of this period, or the last person to leave the premises may instruct the SCU to do so by activating a security system switch located on panel P. The SCU then controls the monitoring function performed by the cameras until it is commanded to shut "off" the cameras. During the monitoring period, the SCU sequentially cycles through each of the cameras obtaining images from each. The cameras are connected to a pan, tilt, and zoom (PTZ) controller 29 and controller 28 utilizes the pan, tilt, and zoom capabilities of the cameras, as appropriate, to obtain the best possible images for processing. The cameras provide video signals at a controllable frame rate which can be a constant frame rate (15 Hz, for example), or adjustable. The frame rate for each camera is separately controllable.

Figure 7:
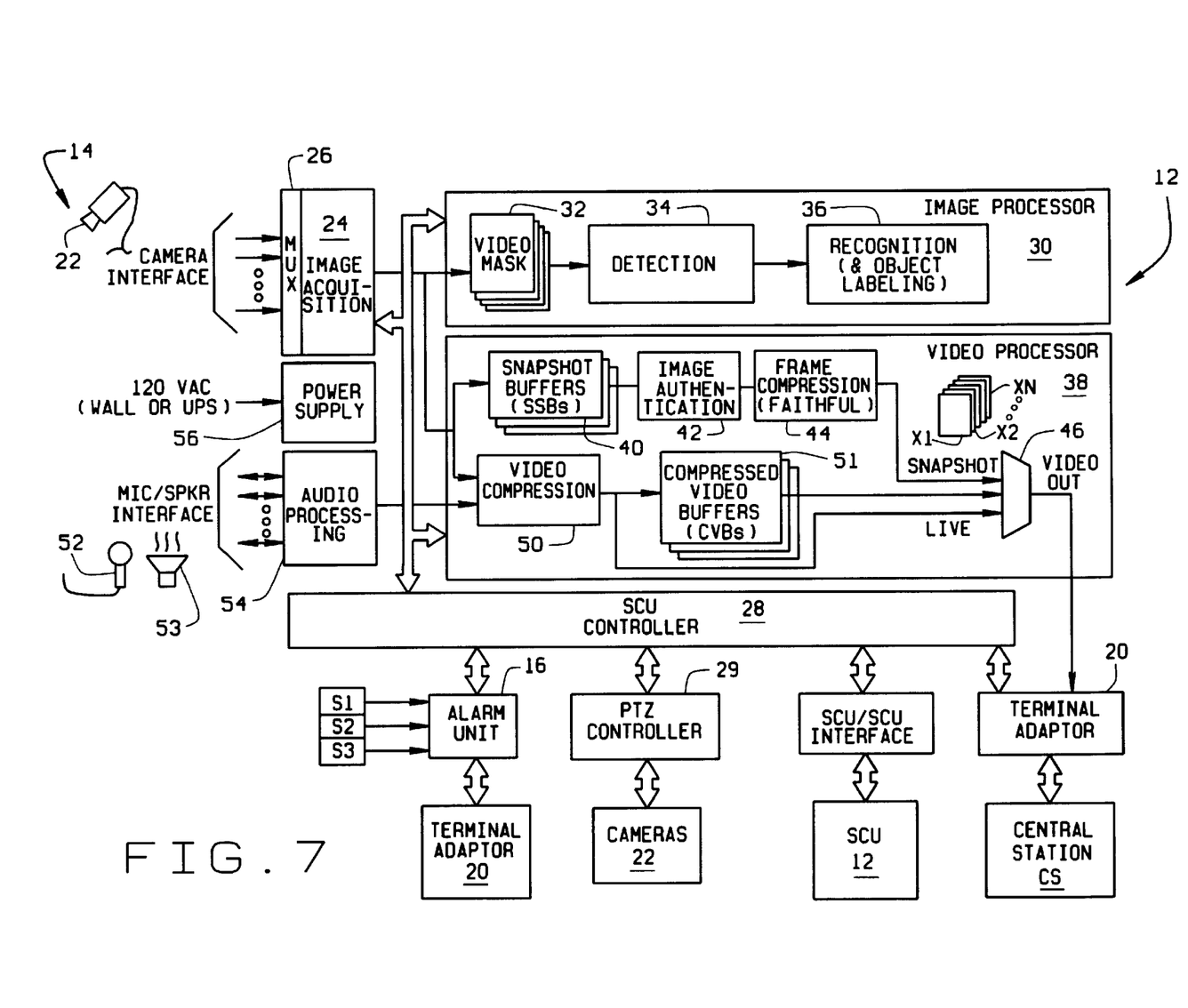
FIG. 7 is a block diagram of a site control unit.

Video signals from the cameras are provided as inputs into an image processor section 30 of the SCU. Processor 30 looks sequentially at an image from each camera 22, and compares that image to a prior stored image from the same camera. The stored image is continually updated. Processor 28 incorporates those algorithms and processing methodology described in U.S. Pat. No. 5,956,424 Low False Alarm Rate Detection; co-pending application 08/771,991, Reduction in False Alarms in an Image Processor; and U.S. Pat. No. 5,937,092, Rejection of Light Intrusion False Alarms, to analyze the contents of the images represented by these signals to determine the presence of an intrusion. For this purpose, processor 30 includes a video masking section 32, a detection section 34, and an object recognition and labeling (classification) section 36. It will understood that the functions performed by processor 30 may be incorporated in computer software programmed to execute the algorithms employed as part of the detection, analysis, and classification processes. In operation, video masking section 32 is used to filter known or perceived motion present within a scene. Detection section 34 operates to detect movement in unmasked portions of a scene. Recognition section 36 then operates to classify and label the cause of the movement. An alarm is given only if recognition section 36 identifies the cause of the movement as one of a class of predetermined causes representing an intruder on the premises.

As described in these co-pending applications, processor 30 operates to discover if there is a change in any of the scenes being viewed by the respective cameras 22, and if any such change is caused by, i) noise, such as video aliasing, or ii) an inanimate object, such as lighting changes, lightning, flash lights, car headlamps, the moving hands of a clock, computer screen savers with moving objects, air conditioning or heating blown drapery, rotating machinery, etc.; or iii) an animate object, animal or human. As previously discussed, only the latter constitutes true detection of an intruder. The rest constitute a false alarm, were an alarm given to a system operator O. Those skilled in the art will understand that any of the other causes of a change in a scene could be discerned by an operator, provided an adequate quality of video were relayed to the operator. But, it is an important advantage of alarm system 10 and the SCU that the monitoring function is now performed on site, and that the overall probability of a false alarm being given is negligible. And, the reliance of the alarm system on the continuing vigilance of the operator to detect an intrusion has been eliminated. Were a human present, and if processor 30 failed to detect him or her and alert the alarm system, then the system detection fails not because of a failure of the operator, but because the operator is never made aware of the intrusion. However, the ability of the SCU to discriminate between a human presence and those conditions which would cause false alarms is a key advantage of the invention. The fact the alarm system does not need an auxiliary sensor such as one of the sensors S1–S3 to trigger the SCU, and the fact that the processor portion of the SCU discriminates beyond just differencing two frames of video makes the invention a more powerful monitoring and detection tool than existing alarm systems, none of which have the discrimination and classification capabilities of the alarm system. That is, none of the prior systems either classify only off the scene, or all of the scene they survey. The majority of the time SCU 12 will cycle from camera to camera, and because the scenes from these cameras will be unchanging, there will be nothing to investigate. This substantially reduces the work load of an operator O. Additionally, as no constant communication channel is required back to the central station, since, most often, there is nothing to report, there are substantial savings in the cost of communication channels, i.e. telephone bills.

Figure 8A:
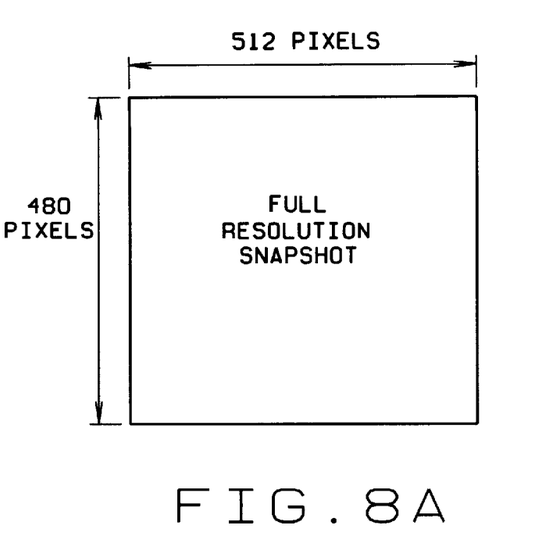
FIG. 8A represents a frame of video (snapshot) obtained from a camera.
Figure 9:
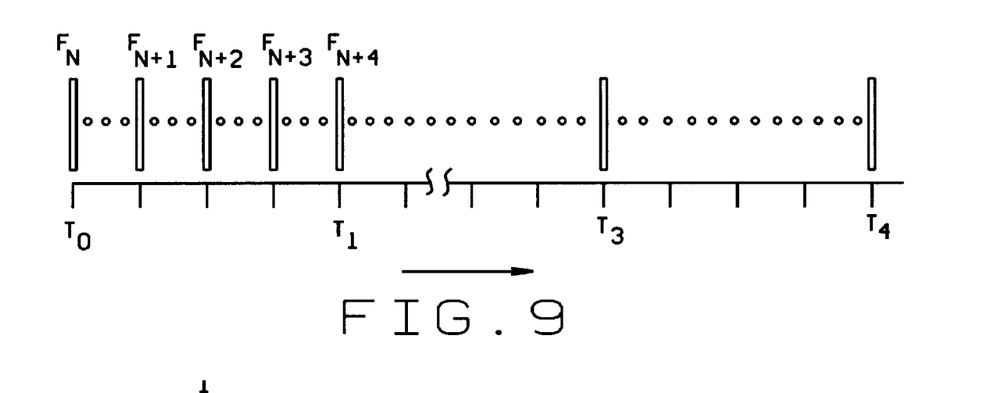
FIG. 9 is a representation of a time line to illustrate the frame rate at which images are acquired by the imaging system of the site control unit, and at which snapshots can be provided by the site control unit to an alarm system operator; and, FIG. 10 is a representation of the image storage capability of the site control unit.
Figure 10:
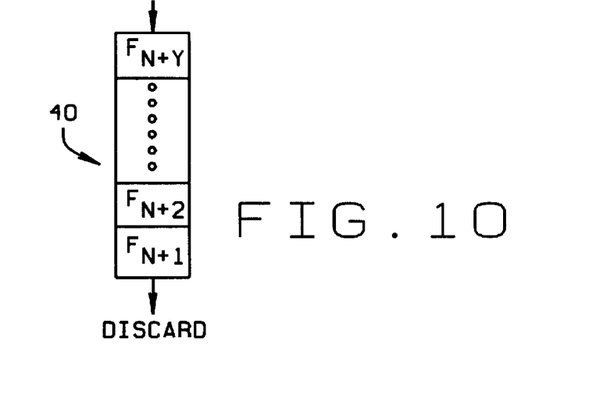

When the processing performed by processor 30 indicates the presence of an intruder, SCU 12 performs a number of tasks. First, the SCU acquires and stores a full resolution "snapshot" X of the event. That is, the snapshot comprises a full frame of video taken from a camera observing the scene where the intrusion has occurred. Referring to FIGS. 8A, this figure represents a full frame of video obtainable from a camera 22. The frame size is, for example, 512*480 pixels. In the processing operations performed by processor 30, the full frame image of a scene is processed Snapshots of the scene begin with the first image indicating a change and continue to be taken at predetermined intervals after an intrusion is detected. Referring to FIG. 9, a time line is represented for the frame rate at which images are obtained by a camera 22. As previously noted, this the frame rate is 15 Hz, or it can be adjustable for any of the cameras. At time $T_0$, a frame $F_n$ is created. Thereafter, at intervals of one-quarter second, for example, the frame created at the time is used to produce a snapshot X1–Xn. Thus, from time $T_0$ to time $T_1$, snapshots are created for the respective frames $F_{n+1}$, $F_{n+2}$, $F_{n+3}$, and $F_{n+4}$. Snapshots are taken from the frames produced by whichever camera is selected at a particular time. All of these snapshots are stored in a snapshot buffer 40 of the video recorder, and the buffer has the capacity to store several snapshots. It will be understood that the number of snapshots which can be stored in buffer 40 is a function of the capacity of the memory and that, if desired, all of the snapshots could be retained were the memory large enough. Usually, unless an intrusion has been detected, there is normally no reason to retain snapshots. Thus, as shown in FIG. 10, the respective snapshots are discarded on a first in-first out basis by buffer 40. That is, the oldest snapshot (the first one in) is discarded (first out) to make room in the buffer for the most recent snapshot. When an intrusion is detected, the snapshot for that event is first authenticated and then sent to the central station. Image authentication is performed at a section 42 of the video processor and is performed in accordance with the teachings of co-pending application 08/757,838. The authenticated snapshot is now data compressed, as indicated at 44, and supplied to the central station through a video output 46 of the SCU, and terminal adapter 20.

In addition to transmitting the snapshot, the SCU alerts alarm unit 16 which, in turn, actually communicates the alarm to the central station. In addition, the alarm unit, through terminal adapter 20 takes control of the entire available bandwidth for communication between the SCU and the central station so the SCU can provide video images to a workstation 106 at the central station for viewing by the operator. When an intrusion is detected, SCU 12 attributes more time to the camera that first detected the event. Processor 30 continues image processing in order to confirm or cancel the alarm according to whether or not the discrimination on that camera is consistent. Simultaneously, the SCU also continues to check all of the other cameras, albeit at a reduced service rate, to check for any intruders in their observed scenes. If an intrusion is confirmed by the continued processing performed by image processor 30, SCU 12 compresses subsequent frames of video and stores them as described hereinafter. This is in addition to the SCU continuing to periodically take and store full resolution snapshot for transmission to the central station once the communication path to the central station is established.

Once established, video images are continuously compressed and relayed to the system control. This done with minimum latency, at a fast frame rate, and with as good a quality as is permissible by the communication channel bandwidth and the requisite compression required. Preferably, communications is through an ISDN line which offers, by banding two D channels, 128 Kbps for video transmission. Using an H.261 video compression system, an uprate of 15 frames/sec using a CIF formatted (352×288) video can be achieved. The task of a system operator O at the central station is readily achieved if SCU 12 provides a fast update rate with good quality video, within the channel bandwidth allocated, and with little to no latency. H.261 is a compression standard th at enables the desired level of performance to be achieved over an ISDN line. With the use of more sophisticated compression schemes, around the H263 ITU standard, for example, SCU 12 will pro vide comparable performance over a POTS line. Minimizing latency is important because apart from SCU 12 periodically storing full resolution snapshots of the frame size shown in FIG. 8A, operator O can instruct the SCU to take snapshots.

Upon receipt of snapshots from the SCU, the operator's task is to confirm the presence of an intruder and relay the information to the necessary authorities for them to investigate.

While operator O is viewing the scene from the camera 22 from which the first event occurred, SCU 12 continues to monitor the rest of the facility with the other cameras being used. Should one or more of these cameras also detect the presence of an intruder, then operator O will be alerted to these occurrences as well with the SCU now providing snapshots from these other cameras as well as those from the first camera. Once the authorities hare been alerted, operator O can turn his attention to viewing snapshots from other cameras. All video communications between SCU 12 and the central station are stored for later analysis at video server 102. As noted, by the time a communications path is established between the SCU and the central station, the SCU will have stored a number of snapshots. Upon request by the operator, "thumbnails," or abbreviated snapshots are transmitted to a workstation 106 at the central station where they can be arranged in a mosaic pattern by the operator for his or her viewing. After viewing the thumbnails, the operator can select one or more of the images for transmission from SCU 12 to the system control. Reviewing thumbnails is comparable to reviewing multiple photographic slides a t once, with the intent to select one or more for "blowing up" to full size prints. In the preferred embodiment, a thumbnail is 1/16 the size of a snapshot (i.e. every fourth pixel and every fourth row of a frame as depicted in FIG. 8A and shown as in FIG. 8B) and can therefore be transmitted in 1/16 the time of a snapshot. After viewing the snapshots, the operator can select one or more full size images (snapshots) for transmission. This new transmission of snapshots is at a slower rate using lossless compression techniques and full RS170 resolution. This is useful for identification purposes, and for confirmation of details to the police. Eventually all snapshots may be transferred from the SCU using lossless compression. Each snapshot is authenticated again using the process described in co-pending application 08/757,838. In addition to being authenticated at the source (i.e., SCU 12), each snapshot is verified upon reception at the central station so verified, authenticated images can be later used for prosecution purposes.

Figure 8B:
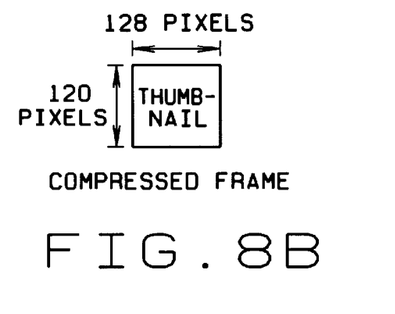
FIG. 8B represents a compressed frame of video (thumbnail) stored within a memory portion of the SCU.

As shown in FIG. 7, the images from cameras 22, in addition to being supplied to snapshot buffer 40 are also supplied to a video compression module 50 in which the compressed frames of FIG. 8B are formed. From module 50 compressed images are either sent directly (i.e., live) through video output 46 to the central station, or the compressed images are stored in a compressed video buffer 51 for subsequent transmission. When an intrusion is detected, video compression immediately begins, and the storage capacity of buffer 51 is sufficient to store several seconds of compressed video. The capacity of the buffer is sufficient so that no images are lost between the time the intrusion is detected and a full bandwidth communication's channel is established between the SCU and the central station. Live video is sent to the system control under predefined conditions or operating control.

In addition to the video cameras 22, audio microphones 52 may be employed about the premises. The cameras 22 may incorporate the microphones, or the microphones may be separately installed. Audio received by the microphones is processed by an audio processing module 54 of the SCU. Audio output signals from the processing are supplied to video compression module 50 for the audio to be compressed. The compressed video signals from the SCU are then transmitted to the system control with interlaced compressed audio, thus enabling the operator to also listen in on an intrusion as well as view it.

Once a communications path is established between the SCU and the central station, the operator can now control a number of facets of the SCU operation. Besides control of the snapshots, the operator can override a particular camera from which the video is being compressed and relayed to him, and rather obtain video from another camera. This is particularly useful when there may be more than one intrusion detected and the first detection is from an area of the premises having less priority than that where there is another detection. By being able to observe the other scene, the operator can use the SCU to monitor the detection of the intruder in the higher priority area. Again, the operator can use the pan, tilt and zoom capabilities of a camera to help him obtain better observe the scene.

Finally, there a number other features concerning the SCU which are important for the overall operation and performance of alarm system 10. First, while the SCU is normally powered from the standard 120 VAC supplied to the premises, the SCU is also connected to an uninterrupted power supply (UPS) 56. UPS 56 will maintains power to the SCU for prolonged periods of time if there is a failure in facility power, thus enabling the SCU to fully perform its operating functions.

Second, to ensure that the video input to the SCU has not been tampered with, the SCU performs a self-check procedure to verify that a video signal is present, that there is content from the scene being observed, and that the source is from the desired camera.

Third, there is a substantial amount of software utilized by the SCU in performing all of its various functions. And, the SCUs will be remotely located over a wide territory making it cumbersome to individually access each SCU to upgrade or update the different software employed by the SCU. Accordingly, the SCUs are designed to facilitate remote upgrading and updating of the software from the central station. This can be done using the communications channels normally established between the two locations.

What has been described is a site control unit for use in an alarm system in which a system control for the alarm system may either be local to, or remote from the site control unit. Any monitored facility may have one or more SCUs depending upon the size of the facility. A SCU can accommodate a plurality of cameras which can be color, black and white, analog or digital cameras. The cameras have pan, tilt, and zoom capabilities and the cameras can operate at up to 15 frames per second of high resolution video. Audio acquisition can also be employed at the facility and acquired audio is interleaved with processed video to provide a system operator both visual and audio monitoring capabilities. The SCU is used in conjunction with an alarm unit.

It is a particular feature of the SCU to process acquired video so as to detect actual intrusions of the premises and inform a system operator of such an event; while not giving false alarms to the operator. When an intrusion is detected, a wide bandwidth communications link is established between the SCU and system control for transmission of full resolution snapshots of the intrusion for viewing by the operator, as well as providing the operator compressed video images. The operator can remotely select snapshots for viewing and can create a mosaic of snapshots for review. The snapshots are authenticated both at the SCU and the central station, and all the snapshots are stored can be stored if so desired.

The system operator can remotely tour the premises using the SCU and the SCU has self checking capability to verify its operational status. Software employed in the SCU can be remotely upgraded.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

We claim:

1. In a security system for monitoring a premises to detect intrusions onto the premises, a site control unit (SCU) comprising:
    means acquiring an image of a scene on the premises; and,
    a processor processing said image to detect motion within the scene, to classify the source of the motion as human or non-human, and to provide an indication of said motion as a possible intrusion of the premises only if the source is classified as being human.

2. The SCU of claim 1 further including a video recorder recording said image if said processor provides said indication.

3. The SCU of claim 1 further including an imaging means for obtaining said image.

4. The SCU of claim 3 wherein said image is a video image and said imaging means comprises a plurality of cameras each of which obtains a video image of a different portion of the premise, said processor processing the video images from each camera.

5. The SCU of claim 4 wherein said imaging means comprises an infrared camera.

6. The SCU of claim 4 wherein said imaging means comprises an ultraviolet camera.

7. The SCU of claim 3 wherein said imaging means comprises an acoustic sensor.

8. The SCU of claim 3 wherein said imaging means comprises a radar.

9. The SCU of claim 4 wherein said cameras are analog television cameras.

10. The SCU of claim 4 wherein said cameras are digital television cameras.

11. The SCU of claim 4 wherein said cameras are black and white television cameras.

12. The SCU of claim 4 wherein said cameras are color television cameras.

13. The SCU of claim 4 further including a controller separately controlling each camera, said controller individually turning each camera "on" and "off", and controlling pan, tilt, and zoom functions of each camera.

14. The SCU of claim 13 wherein said controller further controls said processor to selectively activate and deactivate said processor for each individual camera.

15. The SCU of claim 13 wherein said controller further controls a frame rate at which each camera obtains a video image of the scene observed by that camera.

16. The SCU of claim 2 wherein said video recorder produces snapshots of any scene viewed by a camera, said snapshots being produced for every predetermined number of frames of video obtained by a camera.

17. The SCU of claim 16 further including a buffer for storing said snapshots.

18. The SCU of claim 16 further including transmission means transmitting video including said snapshots to a central station of said alarm system.

19. The SCU of claim 18 wherein said snapshots represent uncompressed video images of a scene and said transmission means provides lossless transmission of said snapshots.

20. The SCU of claim 18 wherein said video recorder includes means authenticating a snapshot prior to the snapshots transmission to the central station.

21. The SCU of claim 18 further including at least one audio receiver located about said premise for acquiring audio, said video processor processing audio received by said receiver, and said transmission means transmitting said audio together with said video.

22. The SCU of claim 21 further including at least one audio speaker located about said premise for broadcasting audio to the premise, said transmission means transmitting audio to said premise for broadcast through said speaker.

23. The SCU of claim 2 wherein said video recorder produces compressed video images from said cameras.

24. The SCU of claim 23 wherein said transmission means further transmits said compressed video images to said central station.

25. The SCU of claim 23 wherein said video recorder further includes a buffer for storing said compressed images.

26. The SCU of claim 25 wherein said transmission means further transmits said buffered, compressed video images to said central station.

27. The SCU of claim 13 wherein said controller is accessible from said central station for an operator thereat to remotely control said cameras and said processor through said controller to perform a walk about of the premise.

28. The SCU of claim 1 wherein said processor includes video masking means filtering known motion present within a scene observed by said imaging means, detection means detecting motion in unmasked portions of the scene, and recognition means classifying the cause of said motion as human or non-human whereby giving an indication only when the cause of motion is classified as human prevents false alarms and unwanted alarms being given.

29. A site control unit (SCU) for a premises monitored by a video security system comprising:
    means acquiring video images of scenes of the premises;
    a processor performing intelligent image processing on said video images to provide an indication of a possible intrusion of the premises, said processor eliminating possible causes of false and unwanted alarms and providing said indication only when motion within a scene is detected by said processor and classified as being human motion, or motion from an unknown cause; and,
    a recorder recording said image if said processor provides said indication, said recorder producing a snapshot of the scene in which the motion is detected, and the site control unit authenticating the snapshot for evidentiary purposes.

30. The SCU of claim 29 wherein said processor includes video masking means filtering known motion present within a scene observed by said imaging means, detection means detecting movement in unmasked portions of the scene, and recognition means classifying the cause of said movement, an alarm being given only if said cause is classified as a human representing an intruder on the premises, or unknown and therefore requiring further investigation.

31. The SCU of claim 23 further including a plurality of cameras operating in the visible portion of the light spectrum.

32. The SCU of claim 31 wherein said cameras are color television cameras.

33. The SCU of claim 31 wherein said cameras are black and white television cameras.

34. The SCU of claim 31 further including a controller separately controlling each camera, said controller individually turning each camera "on" and "off", and controlling pan, tilt, and zoom functions of each camera.

35. The SCU of claim 34 wherein said controller further controls said processor to selectively activate and deactivate said processor for each individual camera.

36. The SCU of claim 34 wherein said controller further controls a frame rate at which each camera obtains a video image of the scene observed by that camera.

37. The SCU of claim 29 wherein said recorder produces snapshots of any scene viewed by a camera, said snapshots being produced for every predetermined number of frames of video obtained by a camera.

38. The SCU of claim 37 wherein said recorder further produces compressed video images from said cameras.

39. The SCU of claim 38 wherein said recorder further includes buffers storing said snapshots and said compressed video images.

40. The SCU of claim 39 further including means transmitting said snapshots and said compressed video images.

41. The SCU of claim 40 wherein said recorder includes means authenticating transmitted snapshots.

42. The SCU of claim 29 further including audio speakers and receivers located at said premises, said recorder recording audio signals in addition to said video images for transmission of said audio signals with said video images, and said site control unit receiving and broadcasting audio transmitted to said premise over said speakers.

43. A site control unit (SCU) located at a premises being monitored by a video security system comprising:

means acquiring video images of scenes about the premises;

an image processor processing said video images to eliminate possible causes of false and unwanted alarms of an intrusion of the premises and reliably detecting actual intrusions, said processor including video masking means filtering known motion present within a scene observed by said imaging means, detection means detecting movement in unmasked portions of the scene, and recognition means classifying the cause of said movement as being either human or non-human, an indication being given only if said cause is classified as as being a human intruder on the premises, or an unknown cause; and, a video recorder recording images of actual intrusions and supplying said recorded images to a security system operator for said operator to inform authorities of an intrusion, said video recorder producing snapshots of a scene in which an intrusion is detected, authenticating said snapshots, and transmitting said snapshots for viewing by said operator.

44. The SCU of claim 43 wherein said snapshots are produced for every predetermined number of frames of video acquired by said imaging means.

45. The SCU of claim 44 wherein said video recorder further produces compressed video images from said cameras, said compressed video also being transmitted to said operator.

46. A method of monitoring a premises to detect an intrusion of the premises comprising:

observing the premises with an imaging means and obtaining images of scenes about the premises observed by said imaging means;

processing said images to eliminate possible causes of false and unwanted alarms of an intrusion of the premises including distinguishing between human and non-human motion, detecting an actual intrusion resulting from human motion, and providing an indication when an intrusion is detected; and, recording an image of said intrusion and supplying said recorded image to a security system operator for said operator to inform authorities of said intrusion, recording said image includes producing snapshots of the scene in which said intrusion is detected, authenticating said snapshot, and transmitting said snapshot for viewing by said operator.

47. The method of claim 46 wherein said processing includes filtering known motion present within a scene observed by said imaging means, detecting movement in unmasked portions of the scene, and classifying the cause of said movement with an indication being given only if said cause is classified as one of a class of predetermined causes representing an intruder on the premise.

48. The method of claim 46 wherein said processing is performed by an image processor and the method further includes remotely programming said image processor.

49. The method of claim 46 wherein said recording is performed by a video recorder and said method further includes remotely programming said video recorder.

* * * * *